3,251,886
PRODUCTION OF 4-METHYLMERCAPTOPHENOLS AND 3-ISOPROPYL DERIVATIVE
Basil S. Farah and Everett E. Gilbert, Morris Township, Morris County, N.J., assignors to Allied Chemical Corporation, New York, N.Y., a corporation of New York
No Drawing. Filed May 27, 1963, Ser. No. 283,585
12 Claims. (Cl. 260—609)

This is a continuation-in-part of our application Serial No. 169,646, filed January 29, 1962, now abandoned.

The present invention relates to an improved process for production of 4-methylmercaptophenols.

Many phosphates and thiophosphates derived from methylmercaptophenols are extremely potent insecticides. For example, the high insecticidal activity of diethyl 4-methylmercaptophenyl phosphate derived from 4-methylmercaptophenol is described by Fukuto and Metcalf in the Journal of Agricultural and Food Chemistry, vol. 4 (1956), pages 930–935.

Commercialization of these phosphates and thiophosphates has been hampered by lack of a simple and economical method of preparing the intermediate methylmercaptophenols. For example, the method now generally employed in preparing 4-methylmercaptophenol involves starting with the highly expensive 4-aminophenol, converting it to 4-mercaptophenol via the difficult and dangerous diazonium reaction and then methylating the mercapto group. Other methods for preparing 4-methylmercaptophenol employ catalysts which form varying amounts of undesired 2-methylmercaptophenol, thus necessitating separation by distillation procedure.

The principal object of the present invention is to provide an economical and efficient process for production of 4-methylmercaptophenols in high yield. More specifically, the object of the invention is to provide an economical and efficient process for production of 4-methylmercaptophenols in high yield by alkaline hydrolysis of 4-halothioanisoles. Other objects and advantages of the invention will appear in the following description.

In accordance with the present invention, it has been found that an alkali metal 4-methylmercaptophenate may be prepared by reacting a 4-halothioanisole with an aqueous solution of an alkali metal hydroxide in the presence of a catalyst comprising copper and cuprous oxide. The alkali metal 4-methylmercaptophenate may then be acidified and the corresponding 4-methylmercaptophenol recovered therefrom.

The production of 4-methylmercaptophenol, for example, may be represented by the following equations wherein the 4-halothioanisole is 4-chlorothioanisole, the alkali metal hydroxide is sodium hydroxide and the acidifying agent is hydrochloric acid.

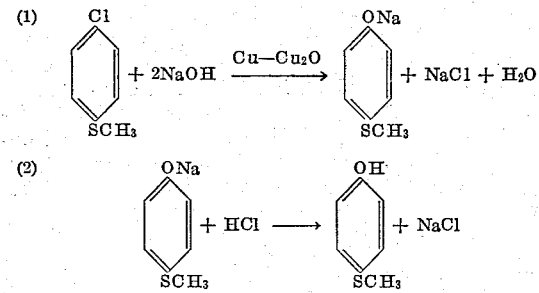

There are numerous teachings in the prior art illustrating the sensitivity of the thioether linkage to alkaline conditions. Cleavage to thiols and hydrocarbons or even complete elimination of sulfur are known to occur. It was, therefore, indeed unexpected when high yields of 4-methylmercaptophenols were obtained by the alkaline hydrolysis process of this invention.

Any 4-halothioanisoles may be employed in the process of this invention; however, we prefer to employ 4-chlorothioanisoles or 4-bromothioanisoles. Although it has been found that the 4-bromothioanisoles react somewhat more easily than the 4-chlorothioanisoles to give equivalent product yields, the latter reactants, on the other hand, are less expensive.

The 4-halothioanisoles used as reactants in the process of this invention may be readily prepared by direct halogenation of thioanisoles which, in turn, may be prepared by methylation of thiophenols. 2-isopropyl-4-halothioanisoles, for example, are heretofore unknown materials which are reacted to form the new compound, 3-isopropyl-4-methylmercaptophenol.

It is preferred to employ sodium hydroxide as the alkali metal hydroxide in the process of this invention. Other alkali metal hydroxides, such as potassium hydroxide or lithium hydroxide or mixtures of any two or more alkali metal hydroxides, can also be used.

The alkali metal hydroxide is generally employed in amount of about 2.5 to 3.0 mols per mol of the 4-halothioanisole and in admixture with sufficient water to form an aqueous solution of the alkali metal hydroxide of about 10 to 20 percent by weight concentration.

Although the relative proportions of copper and cuprous oxide in the catalyst may vary within wide limits, it is preferred that the weight ratio of copper to cuprous oxide be about 0.3–2 to 1. The catalyst is generally employed in amount of about 10 to 15 percent by weight of the 4-halothioanisole.

The reaction is carried out at elevated temperatures, typically in the range of about 175° to 300° C. or higher, for at least about 1½ hours. Preferably, the reaction temperature is maintained between about 200° to 280° C. under the autogenous pressure of the reaction mixture. The hydrolysis reaction proceeds readily under the preferred conditions to produce alkali metal 4-methylmercaptophenate in reaction time ranging from about 1½ to 5 hours. No alkali metal 2-methylmercaptophenate is formed during the reaction.

In preferred operation, the 4-halothionanisole, the alkali metal hydroxide and water, or an aqueous solution of the alkali metal hydroxide, and the copper-cuprous oxide catalyst are placed in a suitable pressure resistant reaction vessel, e.g. a steel or stainless steel autoclave, in the desired proportions. The mixture is agitated and heated at reaction temperature of about 200° to 280° C. under the autogenous pressure of the reaction mixture for a reaction time of about 1½ to 5 hours. The resulting reaction mass is then cooled, and the desired product is recovered by any suitable procedure.

The process can be carried out in continuous manner by feeding the 4-halothioanisole, aqueous solution of alkali metal hydroxide and copper-cuprous oxide catalyst to a suitable pressure resistant vessel, wherein the reaction mixture is agitated and heated under the autogenous pressure of the mixture and at temperatures and for reaction times previously described, and thereafter cooling and discharging the hydrolyzed mixture from the vessel, after which the 4-methylmercaptophenol is recovered.

The following examples illustrate ways in which the principle of this invention has been applied. In the examples, parts are by weight:

EXAMPLES 1 TO 6

In each of these examples, the 4-halothioanisole, aqueous alkali metal hydroxide and copper-cuprous oxide catalyst were placed in a steel bomb which was sealed and provided with a heating jacket equipped with means for shaking the bomb. The jacket was heated to the desired temperature as rapidly as possible (about one hour) and maintained at the desired temperature range for the prescribed number of hours. The bomb was then allowed to cool, and the resulting reaction mass was removed, filtered, washed with ether and then heated to its boiling point. Activated alumina (80–200 mesh) was added to effect decolorization of the mass, and the mass was then boiled for a few minutes, filtered, cooled and acidified with hydrochloric acid. The precipitated 4-methylmercaptophenol was filtered off and finally recrystallized from a mixture of benzene and petroleum ether (1:1).

The criticality of use of the copper-cuprous oxide catalyst is shown by comparing Examples 2 and 6, which are identical except that in Example 2 the catalyst was used. When no catalyst was employed (Example 6), negative results were obtained.

The results obtained are tabulated below:

| Example | Reactant | Reactant | | Aqueous NaOH | | Catalyst $Cu-Cu_2O$, Parts | Temp., °C. | Reaction Time, Hours | 4-Methylmercaptophenol | |
|---|---|---|---|---|---|---|---|---|---|---|
| | | Parts | Mol | Concentration, percent | Parts | | | | Parts | Yield, percent [1] |
| 1 | 4-Bromothioanisole | 40 | 0.2 | 10 | 200 | 2.5–7.5 | 250–275 | 3 | 17 | 61 |
| 2 | ----do---- | 40 | 0.2 | 10 | 200 | 2.5–7.5 | 200–225 | 3 | 22 | 79 |
| 3 | ----do---- | 80 | 0.4 | 20 | 200 | 2.5–7.5 | 255–280 | 2 | 33 | 61 |
| 4 | 4-Chlorothioanisole | 32 | 0.2 | 10 | 200 | 2.5–7.5 | 260–280 | 3 | 16 | 57 |
| 5 | ----do---- | 64 | 0.4 | 10 | 200 | 2.5–7.5 | 250–275 | 1½ | 24 | 43 |
| 6 | 4-Bromothioanisole | 40 | 0.2 | 20 | 200 | None | 200–225 | 3 | None | None |

[1] Based on the 4-halothioanisole charged.

EXAMPLE 7

Part A 30.4 parts of 2-isopropylthiophenol were dissolved in 118 parts of absolute ethanol, and 8 parts of sodium hydroxide pellets were added to the solution and dissolved. 28.4 parts of methyl iodide were added dropwise over a 30 minute period, the temperature rising from room temperature to 50° C. The resulting mixture was refluxed for 30 minutes, poured into water, extracted with ether and the ether extract dried and distilled. A yield of 24 parts of 2-isopropylthioanisole boiling at 55° to 57° C. at 0.35 mm. Hg was obtained.

Part B 40 parts of 2-isopropylthioanisole prepared as described in Part A were dissolved in 126 parts of carbon disulfide, and 40 parts of bromine were added to the solution with stirring, the temperature rising to 28° C. The resulting mixture was refluxed at 51° C. for one hour and then distilled. 52 parts of 2-isopropyl-4-bromothioanisole boiling at 113° to 120° C. at 2 mm. Hg were obtained.

Part C 24 parts of the 2-isopropyl-4-bromothioanisole prepared in Part B, 111 parts of 10% aqueous sodium hydroxide, 1.25 parts of copper powder and 0.75 part of cuprous oxide powder were heated with shaking for 5 hours at temperature of 220° C. in a bomb of the type used in Examples 1 to 6. The bomb was allowed to cool, and the resulting reaction mass was washed out with water. Ether was added to the mass which was then filtered. An ether layer and an aqueous alkaline layer resulted which were separated.

The ether layer was distilled to remove the ether and then vacuum distilled to give three fractions (1) 4.0 parts of unreacted 2-isopropyl-4-bromothioanisole boiling at 92–100° C. at 0.5–0.65 mm. Hg., (2) 3.9 parts of a 50–50 mixture of unreacted 2-isopropyl-4-bromothioanisole and 3-isopropyl-4-methylmercaptophenol boiling at 100–104° C. at 0.45–0.5 mm. Hg, and (3) 2.2 parts of 3-isopropyl-4-methylmercaptophenol boiling at 110–122° C. at 0.4–0.55 mm. Hg.

The aqueous alkaline layer was extracted with ether to remove unreacted 2-isopropyl-4-bromothioanisole. The aqueous layer was then acidified with hydrochloric acid and ether extracted. The ether extract was dried and distilled to remove ether, then vacuum distilled at 0.7 mm. Hg to remove 3 parts of 3-ispropyl-4-methylmercaptophenol boiling at 113.5–117° C.

The total yield of 3-isopropyl-4-methylmercaptophenol based on the 2-isopropyl-4-bromothioanisole charged was 40%.

Infrared analysis of the 3-isopropyl-4-methylmercaptophenol showed strong OH stretching at 2.91 microns, C—H stretching at 3.31–3.42 microns, aromatic skeletal inplane vibrations at 6.22, 6.32 and 6.79 microns and C—H deformation frequencies at 6.96, 7.23 and 7.34 microns.

Although we have described preferred embodiments of the present invention, the invention is deemed to be limited only by the scope of the appended claims.

We claim:

1. A process for preparing an alkali metal 4-methylmercaptophenate which comprises reacting a 4-halothioanisole with an aqueous solution of an alkali metal hydroxide in the presence of a catalyst comprising copper and cuprous oxide under pressure at temperature of about 175° to 300° C.

2. A process for preparing a 4-methylmercaptophenol which comprises reacting a 4-halothioanisole with an aqueous solution of an alkali metal hydroxide in the presence of a catalyst comprising copper and cuprous oxide under pressure at temperature of about 175° to 300° C., acidifying the reaction mass and recovering the 4-methylmercaptophenol therefrom.

3. The process of claim 2 wherein the starting material is 4-chlorothioanisole.

4. The process of claim 2 wherein the starting material is 4-bromothioanisole.

5. The process of claim 2 wherein the starting material is 2-isopropyl-4-chlorothioanisole.

6. The process of claim 2 wherein the starting material is 2-isopropyl-4-bromothioanisole.

7. The process of claim 2 wherein the alkali metal hydroxide is sodium hydroxide.

8. A process for preparing 4-methylmercaptophenol which comprises reacting 4-chlorothioanisole with an aqueous solution of sodium hydroxide in the presence of a catalyst comprising copper and cuprous oxide at temperature of about 200° to 280° C. in a closed vessel under the autogenous pressure of the reaction mixture, acidifying the reaction mass with a mineral acid and recovering 4-methylmercaptophenol therefrom.

9. A process for preparing 4-methylmercaptophenol which comprises reacting 4-bromothioanisole with an aqueous solution of sodium hydroxide in the presence of a catalyst comprising copper and cuprous oxide at temperature of about 200° to 280° C. in a closed vessel under the autogenous pressure of the reaction mixture, acidifying the reaction mass with a mineral acid and recovering 4-methylmercaptophenol therefrom.

10. A process for preparing 3-isopropyl-4-methylmercaptophenol which comprises reacting 2-isopropyl-4-chlorothioanisole with an aqueous solution of sodium hydroxide in the presence of a catalyst comprising copper and cuprous oxide at temperature of about 200° to 280° C. in a closed vessel under the autogenous pressure of the reaction mixture, acidifying the reaction mass with a mineral acid and recovering 3-isopropyl-4-methylmercaptophenol therefrom.

11. A process for preparing 3-isopropyl-4-methylmercaptophenol which comprises reacting 2-isopropyl-4-bromothioanisole with an aqueous solution of sodium hydroxide in the presence of a catalyst comprising copper and cuprous oxide at temperature of about 200° to 280° C. in a closed vessel under the autogenous pressure of the reaction mixture, acidifying the reaction mass with a mineral acid and recovering 3-isopropyl-4-methylmercaptophenol therefrom.

12. 3-isopropyl-4-methylmercaptophenol.

References Cited by the Examiner

UNITED STATES PATENTS

| 1,607,618 | 11/1926 | Hale et al. | 260—629 |
| 2,041,592 | 5/1936 | Borroughs | 260—629 |

OTHER REFERENCES

Hale et al.: "Industrial and Engineering Chemistry," 20, 114–116 (1928).

CHARLES B. PARKER, *Primary Examiner.*

DELBERT R. PHILLIPS, *Assistant Examiner.*